US007861940B2

(12) United States Patent
Cummings et al.

(10) Patent No.: US 7,861,940 B2
(45) Date of Patent: Jan. 4, 2011

(54) PLATE HANDLING SYSTEM

(75) Inventors: Calvin Dane Cummings, Surrey (CA); Jonathan Michael Dahlgren, Surrey (CA)

(73) Assignee: Eastman Kodak Company, Rochester, NY (US)

( * ) Notice: Subject to any disclaimer, the term of this patent is extended or adjusted under 35 U.S.C. 154(b) by 1112 days.

(21) Appl. No.: 11/568,094

(22) PCT Filed: Feb. 22, 2006

(86) PCT No.: PCT/US2006/006019

§ 371 (c)(1),
(2), (4) Date: Oct. 19, 2006

(87) PCT Pub. No.: WO2006/091558

PCT Pub. Date: Aug. 31, 2006

(65) Prior Publication Data

US 2007/0169655 A1 Jul. 26, 2007

(51) Int. Cl.
*G06K 19/06* (2006.01)

(52) U.S. Cl. ....................................... 235/494; 101/459

(58) Field of Classification Search ..................... 101/6, 101/7, 13, 18, 37, 40, 40.1, 131, 459; 235/494
See application file for complete search history.

(56) References Cited

U.S. PATENT DOCUMENTS

| | | | | |
|---|---|---|---|---|
| 3,809,389 | A | 5/1974 | Wirz | |
| 5,089,845 | A | 2/1992 | Nishida et al. | |
| 5,154,406 | A | 10/1992 | Bauer et al. | |
| 5,655,452 | A | 8/1997 | Blake et al. | |
| 6,238,175 | B1 | 5/2001 | Gotz et al. | |
| 6,354,208 | B1 * | 3/2002 | Bos et al. | 101/463.1 |
| 6,422,801 | B1 | 7/2002 | Solomon | |
| 6,481,953 | B1 | 11/2002 | Michel et al. | |
| 6,601,888 | B2 | 8/2003 | McIlwraith et al. | |
| 6,675,712 | B2 | 1/2004 | Marincic et al. | |
| 6,779,793 | B2 | 8/2004 | Behrens et al. | |
| 6,880,462 | B2 | 4/2005 | Marincic et al. | |
| 7,000,543 | B2 * | 2/2006 | Klein et al. | 101/477 |
| 2003/0140807 | A1 * | 7/2003 | Zahavi | 101/477 |
| 2005/0089389 | A1 | 4/2005 | Cawley | |

FOREIGN PATENT DOCUMENTS

| | | |
|---|---|---|
| EP | 1 223 137 | 7/2002 |
| EP | 1 428 778 | 6/2004 |

* cited by examiner

*Primary Examiner*—Thien M Le
(74) *Attorney, Agent, or Firm*—Donna P. Suchy; Nelson Adrian Blish

(57) ABSTRACT

A plate handling system provides for movement from storage of a variety of image-ready printing plates, organized in plate stacks with interleaf protective slipsheets. Each stack contains plates of a particular size, corresponding to the capabilities of an associated imaging system. Each plate stack is supported by a pallet, which facilitates easy loading and unloading into the plate handling system. A plate picker aligns with the desired plate and transports the appropriately sized plate to an imaging system. The corresponding slipsheet is transported to a storage area where it is stored with a flat orientation.

44 Claims, 9 Drawing Sheets

PLATE HANDLING SYSTEM

CROSS-REFERENCE TO RELATED APPLICATIONS

FIELD OF THE INVENTION

This invention pertains to apparatus, systems and methods for handling plates in the context of a plate imaging system. In particular, the invention relates to the convenient storage of image-ready plates of a variety of sizes, delivery of a particular-sized plate from storage to an imaging system while disposing of an interleaf protective slipsheet.

BACKGROUND OF THE INVENTION

Imaging systems, such as computer to plate (CTP) systems, are well known in the art. Imaging systems record an image on a film or plate. Plates are typically made of an aluminum substrate with a photosensitive emulsion applied to one surface. Plates of a variety of substrate and emulsion compositions are possible, including emulsions with a variety of imaging characteristics (e.g. exposure energy density, image working sense, and run length). Additionally, plate formats range to accommodate a variety of page (e.g. letter size) layouts. For example, plates sized to accommodate a single page up to a plate sized to accommodate thirty-two, sixty-four or more pages are known in the art. Thus, an imaging system can be called upon to process a wide variety plate types.

Manufacturers typically deliver plates in a stack of equivalently sized plates, separated by protective interleaf slipsheets. A plate stack can be delivered on a pallet or other structure that provides support and simplifies conveyance. Alternatively, a plate stack can be delivered in a carton or other protective enclosure. Larger sized plates are difficult to transport and store because of their size, weight and susceptibility to damage.

For many reasons, such as maximizing throughput, and maximizing unattended operating time, many imaging systems provide integrated storage facilities for a quantity of plates that are likely to be used and automated mechanisms for selecting and transporting a plate to be imaged. Prior art imaging systems have incorporated integrated storage of plate stacks. However, it is a challenge to provide for a sufficient quantity of an appropriate variety of plate sizes while minimizing floor space usage.

Loading of a quantity of plates into an imaging system's integrated storage facility, especially large format plates, can be difficult because of their size and weight. Individual plates can weigh between at least 700 g for an 8-up format and at least 2 kilograms for large formats. Storage of 50 plates or more of a given size is desirable to allow the imaging system to operate without user attendance.

Imaging system cassettes, trays, bays or other mechanisms have traditionally been used to constrain the orientation of loaded plates so that plate picking and transport can be reliably accomplished. Storage areas typically contain one or more plate edge stops, guides or other mechanical devices to constrain the loaded plate orientation. For example, a plate bay, housing a carton of plates stacked horizontally and resting on one edge, comprises a stop (bay floor) for supporting one end of the carton which constrains the horizontal plate stack in one dimension. As another example, a plate cassette will typically have at least two stops for adjacent plate edges to constrain the plate stack orientation in two dimensions. Manual loading of a significant quantity of plates into an imaging system storage facility that restricts placement may thus be a time consuming process.

Obtaining and disposing of protective interleaf slipsheets in response to a plate imaging operation presents additional challenges. Slipsheets tend to be attracted to either the plate picked for imaging or to the plate remaining on the top of a plate stack. Slipsheets are typically made of a flimsy and slippery material and so are easily damaged or can become misaligned with an adjacent plate. These characteristics make locating, obtaining and transporting a slipsheet challenging. Additionally, if a slipsheet becomes creased or folded, it can damage the emulsion on the plate it is protecting if it is subsequently dragged across the emulsion surface.

Disposal presents an additional challenge with prior art systems ejecting them from the imaging system or crumpling them and storing them in an internal storage bin. The former method results in additional floor space requirements and can present aesthetic or safety problems. The latter method provides for an efficient use of floor space but suffers from problems of limited capacity, complicated and error-prone mechanics (e.g. slipsheet jams). An additional object of the present invention is to dispose of slipsheets internal to the plate handling system by stacking them vertically. This minimizes storage space, simplifies unloading and transport for final disposal, and presents an opportunity for reuse of the slipsheets.

SUMMARY OF THE INVENTION

The present invention provides a plate handling system to be used in conjunction with an imaging system. The plate handling system enables a significant period of unattended imaging system operation while requiring limited floor space by arranging plate storage areas in a vertical fashion with elevating pick and transport mechanisms. Plates, organized in stacks, can be easily loaded into the plate handling system by one person. Interleaf slipsheets are obtained and are stacked with a flat profile in an internal storage area to minimize storage requirements, increase reliability, protect plate surfaces and enable slipsheet reuse. The invention can be adapted to imaging systems of a variety of types and sizes but is particularly well suited to imaging systems that image plates of a very large size.

In a preferred embodiment of the invention, a plate handling apparatus, coupled with a plate imaging apparatus includes a plate handling system for supplying plates to an imaging system with plate storage facility that has at least one storage area having a plate, that may be part of a plate stack, with an actual storage placement in an actual position and rotation, a controller for controlling a plate handling operation, a plate picker for picking the plate wherein the controller is operative to automatically determine the actual position and rotation of the plate and align the plate picker with the actual position and rotation of the plate prior to picking, and a plate transporter for transporting the plate to the imaging system for exposure.

BRIEF DESCRIPTION OF THE DRAWINGS

In drawings which illustrate non-limiting embodiments of the invention.

1.

2.

3.

4.

5.

6.

7.

8.

DETAILED DESCRIPTION OF THE INVENTION

Throughout the following description, specific details are set forth in order to provide a more thorough understanding of the invention. However, the invention can be practiced without these particulars. In other instances, well known elements have not been shown or described in detail to avoid unnecessarily obscuring the invention. Accordingly, the specification and drawings are to be regarded in an illustrative, rather than restrictive sense.

Figure 1:
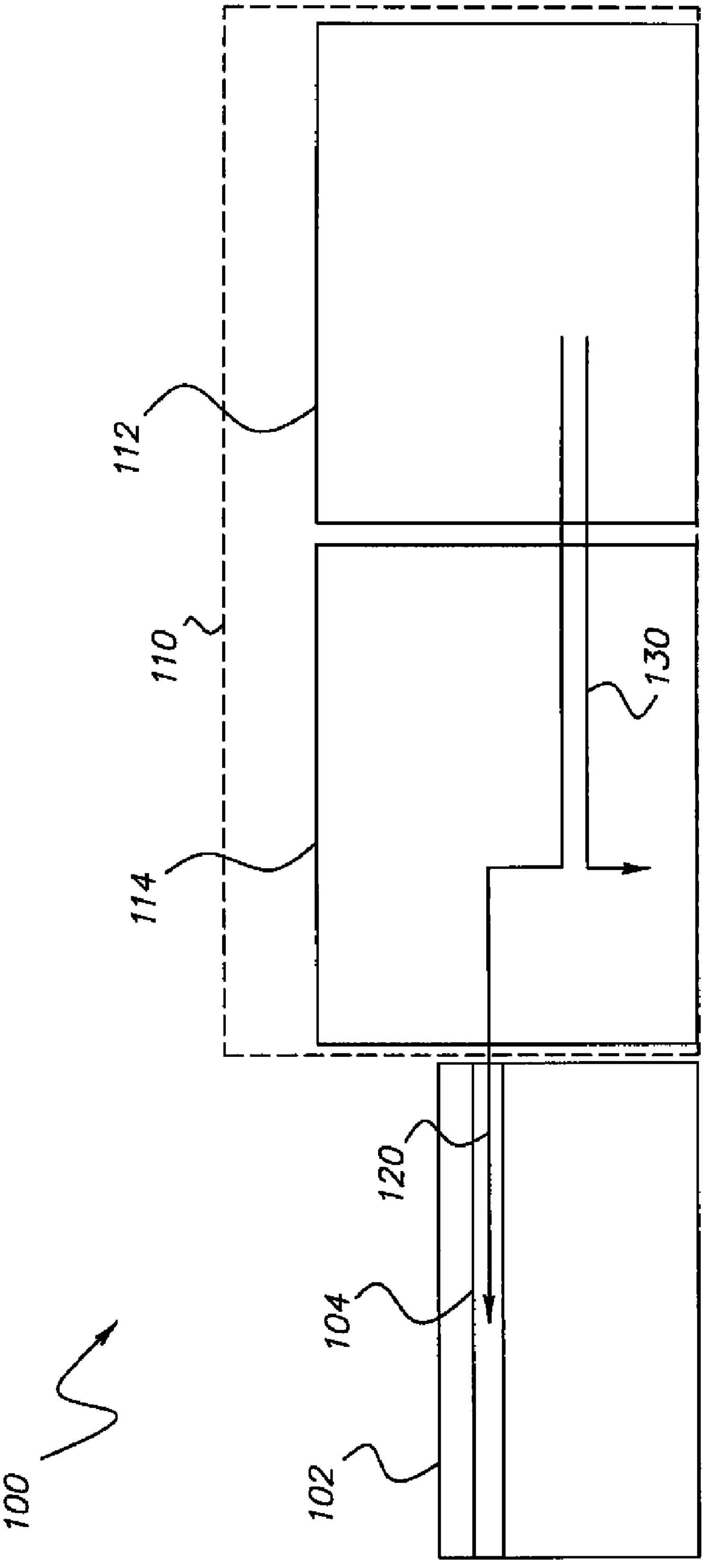
FIG. 1 is a side view of a plate handling system and imaging system according to one embodiment of the invention.

FIG. 1 depicts a plate handling system (PHS) 110 connected with an imaging system (IS) 102. PHS 110 is configured to:

- store a quantity of plates of various sizes, organized in stacks of varying quantities wherein each stack is comprised of plates of the same size;
- pick a plate of a particular size required by IS 102;
- transport a picked plate along a plate path 120 to a plate inlet 104 on IS 102; and
- dispose of a protective interleaf slipsheet by transporting it from the top of a plate stack along a slipsheet path 130 to a storage area.

PHS 110 comprises a plate storage unit (PSU) 112 and a plate transport unit (PTU) 114. PHS 110 can obtain power, compressed air and other operating requirements directly from an external source or from IS 102. PHS 110 can include one or more controllers operative to determine the state of various components and contents of PHS 110, to control the operation of various actuating components of PHS 110, to communicate with IS 102 controller, and to provide a user with one or more status indicators and operational controls. Alternatively, an IS 102 controller or another system connected to both PHS 110 and IS 102 may perform one or more PHS 110 control functions remotely.

PTU 114 is located horizontally adjacent to one side of IS 102 and is of a height enabling it to both access all plates within PSU 112 and transport a plate along a plate path 120 (one possible path shown) to a plate inlet 104 (e.g. a load table). PTU 114 can fasten to IS 102 with removable fasteners to facilitate modular installation and to ensure their alignment during operation. Removable power, air, communication and other connections can be made between the two units. PTU 114 is enclosed in a protective cover with permanent openings for plate transport and removable covers for maintenance access.

In a preferred embodiment of the invention, PTU 114 comprises a horizontally mounted plate transporter, which transports a picked plate from PSU 112, first horizontally to a supporting platform within the plate transporter and then vertically to a plate inlet 104 at which point IS 102 completes the horizontal transport into the IS 102. The plate transporter is preferably mounted on an elevating structure to enable it to pick up and transfer a plate from any number of vertical positions in PSU 112 and IS 102, respectively.

During transport, the plate has a horizontal orientation on the supporting platform with the plate edge, proximal to plate inlet 104, oriented approximately perpendicular to the direction of horizontal motion. The emulsion side of the plate is preferably oriented on top but can be reversed if necessary.

Alternative PTU 114 mechanisms and orientations are also possible. As an example, the plate transporter can be inclined. As another example, PTU 114 can include a plate rotation unit to change direction of movement or to establish an alternate horizontal orientation, independent of plate orientation in PSU 112. As another example, PTU 114 can include a plate-flipping unit to change the emulsion side orientation.

In a preferred embodiment of the invention, PTU 114 also comprises a horizontally mounted slipsheet transporter, which transports a picked slipsheet along a slipsheet path 130 (one possible path shown). Transport occurs first horizontally from the PSU 112 onto a supporting structure within the slipsheet transporter and then down to a slipsheet storage area located near the bottom of the PTU 114 housing where it released for subsequent disposal. The slipsheet transporter is preferably located directly below the plate transporter and mounted on the same elevating structure.

The sheet storage facility is sized to hold approximately 1000 slipsheets in a vertically stacked arrangement. A removable cover allows access to the storage unit so that slipsheets may be discarded.

PSU 112 is located horizontally adjacent to one side of PTU 114 and fastened to PTU 114 with removable fasteners to facilitate modular installation and alignment during operation. Removable power, air, communication and other connections can be made between the two units. PSU 112 is enclosed in a protective cover.

PSU 112 includes a predetermined number of adjustable-height, storage shelves. Each shelf demarcates the bottom of a plate storage area, suited for storing a plurality of horizontally oriented plates and protective interleaf slipsheets stacked on a pallet or other suitable supporting conveyance structure. In a preferred embodiment, each shelf is approximately rectangular, consistent with the enclosure, and all corresponding plate storage areas are accessible through a permanent opening one the side proximal to PTU 114. All plate storage areas are accessible through at least one removable cover on one of the other sides to allow horizontal access for loading and unloading a pallet. All plate storage areas are accessible through a second permanent opening on one of the other sides, but in a preferred embodiment, on the side distal to PTU 114, to allow access by a plate picker. The remaining side is either permanently covered or has a removable cover for maintenance access.

In a preferred embodiment, PSU 112 also comprises a plate picker capable of lifting two adjacent corners of the top plate of a stack of plates. The plate picker also includes a capability to pick and hold the slipsheet located directly below the picked plate. The plate picker is dynamically mounted to an elevating structure capable of precisely positioning the plate picker at the top of any plate stack. The plate picker mounting facilities on the elevating structure are movable in a horizontal direction to enable the plate picker to reach into a shelf area to pick a plate or to withdraw from the shelf area to permit elevation. In some embodiments, the plate picker pulls the held slipsheet away from the plate stack for disposal externally or in an alternative slipsheet storage area.

It is understood that equivalent embodiments to those described above are within scope of the invention. As an example, the plate picker could be a modular unit that is fastened to PSU 112.

Figure 2:
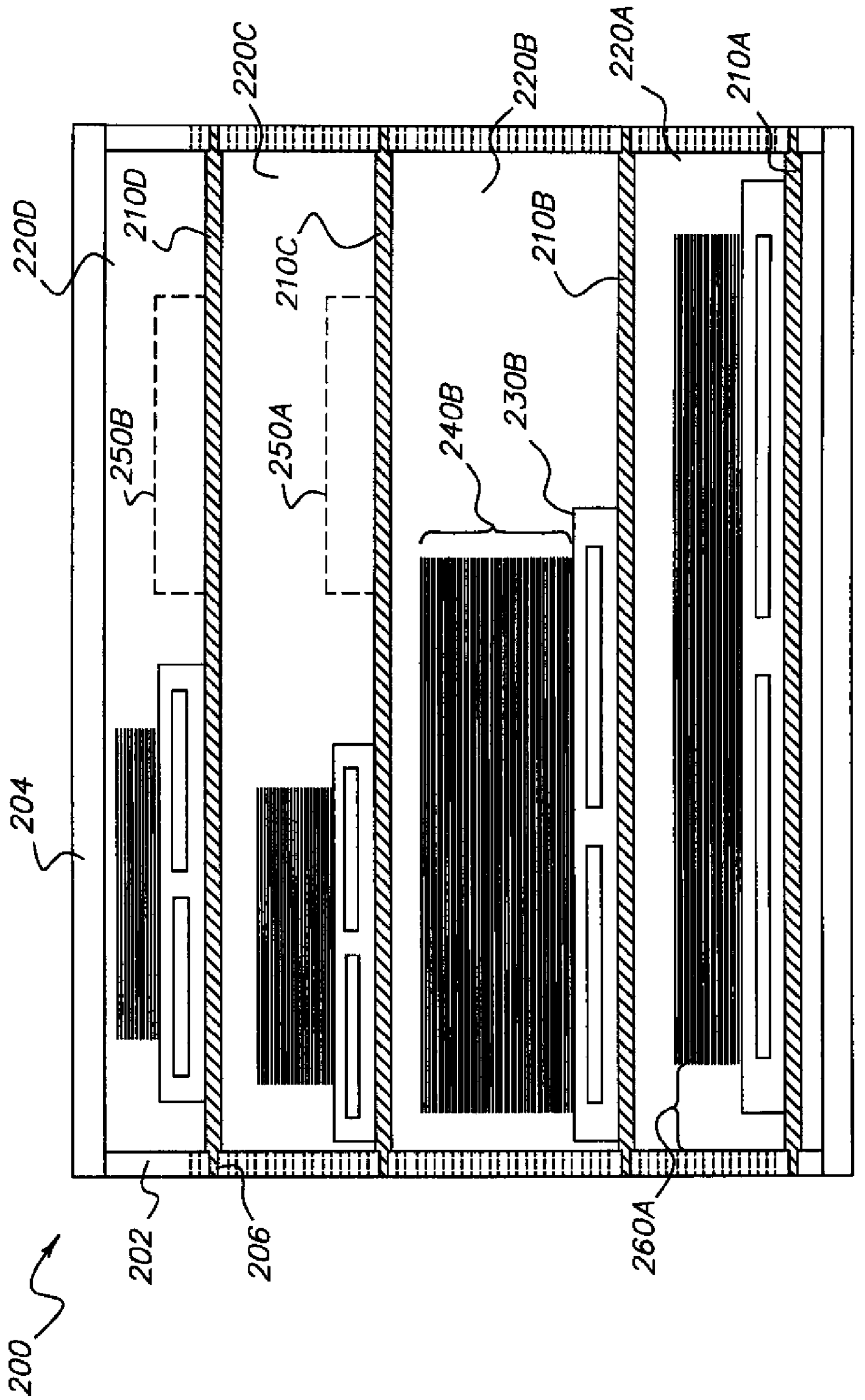
FIG. 2 is a side view of a plate storage unit according to one embodiment of the invention.

FIG. 2 is a side view of PSU 112 according to one embodiment of the invention. It depicts a view of PSU 112, without its protective covering, from the side where pallets are loaded and unloaded. For clarity, the plate picker and associated moving structures are not shown. Vertical members 202 and horizontal members 204 provide structural support for PSU 112. Vertical members 202 contain a plurality of shelf mounting facilities 206 (e.g. threaded holes), each with a consistent vertical spacing such that a shelf 210 may be mounted in any number of vertical positions. A predetermined number of shelves 210A-210D, mounted in exemplary positions, are depicted for a variety of exemplary plate pallets 230 and vertical plate (with interleaf slipsheet) stacks 240. Configuration of shelves 210 is performed either during construction of PSU 112 or at a customer site. Exemplary plate storage areas 220A-220D are depicted. In some embodiments (not shown), shelves 210 can be equipped with an extendable table to allow plates to be stacked by hand or to be lowered by a mechanism such as a crane.

Plate stacks 240 are loaded proximal to the transport side of PSU 112 (the side adjacent PTU 114). Plate stacks 240 can have a variety of sizes, constrained only by the limitations of IS 102 and PHS 110. A plate stack 240 should nominally be loaded with its nearest side approximately parallel with the transport side of PSU 112. Some rotational variance is permitted as will be described later. Plate stacks 240 should be loaded with a plate setback 260 from the transport side. PTU 114 establishes a maximum value for plate setback 260 to ensure accessibility. In one embodiment, the maximum plate setback 260 is configured to be less than eight inches. Plate storage areas 220C and 220D are depicted as having adequate room for alternative slipsheet storage areas 250A and 250B, based on the size of loaded plates.

Figure 3:
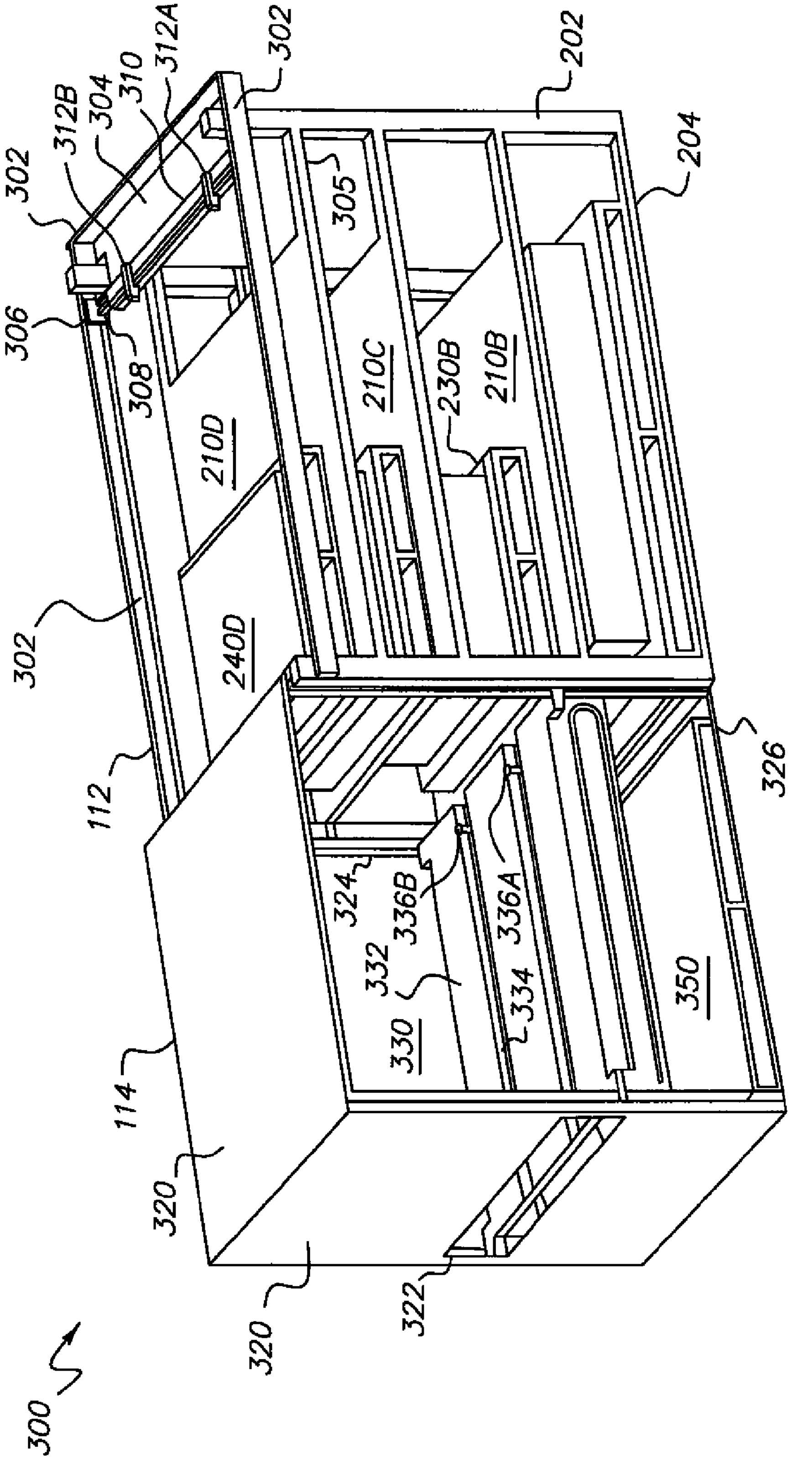
FIG. 3 is a perspective view of a plate handling system depicting main operational elements according to one embodiment of the invention.

FIG. 3 is a perspective view of PHS 110 depicting main operational elements according to one embodiment of the invention. For clarity, portions of the enclosing covers, supporting structures and other details are not depicted.

FIG. 3 depicts PSU 112 as including a picker elevator 302, comprising three horizontal support members positioned outside the vertical support members 202 of PSU 112. Picker elevator 302 is suspended by a set of attached suspension mountings (not shown), which are flexibly coupled to vertical movement members, such as guides or leadscrews (not shown), which are in turn fastened to support members of PSU 112. Picker elevator 302 vertical motion can be accomplished by a variety of means. For example, one or more motors, each coupled with a leadscrew, pulley mechanism, or other linear motion system can be employed to move picker elevator 302 vertically.

Picker elevator 302 also includes a plate picker shelf 304, which is fastened to the supporting members of picker elevator 302. While picker elevator 302 is moving between plate storage shelves 210, plate picker 310 is parked on plate picker shelf 304 so that plate picker 310 does not impinge a shelf support member 305. Picker elevator 302 also includes plate picker mounts 306, flexibly coupled to horizontal movement members, such as guides or leadscrews (not shown), which are in turn fastened to picker elevator 302 support members. Each plate picker mount 306 can move independently towards (and away from) PTU 114. Plate picker mount 306 motion can be accomplished by a variety of means. For example, a motor coupled to a leadscrew, pulley system or other linear motion system can be employed to move each plate picker mount. The controller for picker elevator 302 can be configured to postpone vertical motion while plates are being loaded in a plate storage area. This enables an operator to load plates in one plate storage area 220 while PHS 120 is picking or transporting plates from a different plate storage area 220.

Plate picker 310 is fastened to each plate picker mount 306 by means of a retractable fastener 308. For example, a retractable fastener 308 can comprise a pair of solenoid driven pins. One retractable fastener 308 is positioned at each longitudinal end of plate picker 310. Before releasing a retractable fastener 308, plate picker 310 must be moved so that it is positioned over plate picker shelf 304. Once, retracted plate picker 310 is parked on plate picker shelf 304 and can be moved vertically without impinging shelf support members 305. During a picking operation, retractable fasteners 308 are extended to rigidly couple plate picker 310 with both plate picker mounts 306. Since, plate picker mounts 306 can move independently, one or both of the plate picker mounts 306 or the retractable fasteners 308 are configured to provide some degree of rotational freedom.

Plate picker 310 comprises at least one picker element 312 capable of lifting a portion of the top plate from a plate stack 240. Picker element 312 also obtains and holds a portion of the corresponding slipsheet protecting the plate immediately below the top plate. In a preferred embodiment, two picker elements 312 are configured so that picker elements lift adjacent corners of a plate on the side distal to PTU 114. Each picker element 312 moves independently along the longitudinal axis of plate picker 310 to position at a respective plate corner. In an exemplary alternate embodiment, plate picking rotational freedom can also be obtained by configuring picker elements 312 with the ability to independently move in a direction perpendicular to the axis of plate picker 310 (e.g. plate path 120 direction).

Each picking element 312 is fastened to a separate picker element mount (not shown), which is flexibly coupled to a horizontal movement member that are aligned with longitudinal axis of plate picker 310. A horizontal movement member, such as a guide or leadscrew (not shown), is in turn fastened to plate picker 310. Each picker element mount can move independently. Mount motion can be accomplished by a variety of means. For example, a motor coupled to a leadscrew, pulley system or other linear motion system can be employed to move each picker element mount.

FIG. 3 depicts PTU 114 as including vertical support members 324, horizontal support members 326, protective cover 320 (partially shown), and a plate outlet 322 corresponding to plate inlet 104. It also depicts an elevating transporter 330 and a slipsheet storage area 350 (e.g. removable pallet or tray). Transporter 330 depicts an integrated unit providing both picked plate and slipsheet transport capabilities within one elevating structure. Implementation of the elevating structure can be accomplished in a manner similar to that describe above for picker elevator 302.

Transporter 330 is comprised of a horizontal support structure 332 for supporting and transporting a picked plate. Support structure 332 is configured with two or more slots 334 positioned longitudinally between PSU 112 and plate outlet 322. Each slot 334 provides an opening through support structure 332 from the top to bottom surface. Each slot 334 extends to approximately each longitudinal end of support structure 332. In one embodiment, a movable vacuum bar system (not shown) is mounted transversely to slots 334. Plate suction cups 336 are mounted to the movable vacuum bar, and protrude through slots 334. Plate suction cups 336 are vertically positioned in approximate alignment with the top surface of support structure 332, so that a picked plate is both supported with a substantially flat profile and is firmly held on the non-emulsion side during transport.

The movable vacuum bar system can be moved by a linear motion system similar to those described above for plate picker mount 306. Plate suction cups 336 can thus be moved together approximately the full length of slots 334. Detailed plate transport operation is described below. The structure of slipsheet transport mechanisms and their operation is also described below.

Figure 4B:
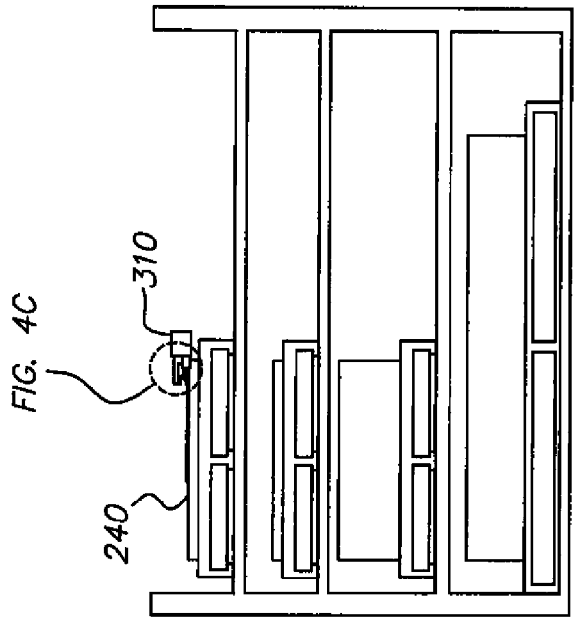
FIGS. 4A-4E are perspective and side views illustrating plate picking according to one embodiment of the invention.
Figure 4A:
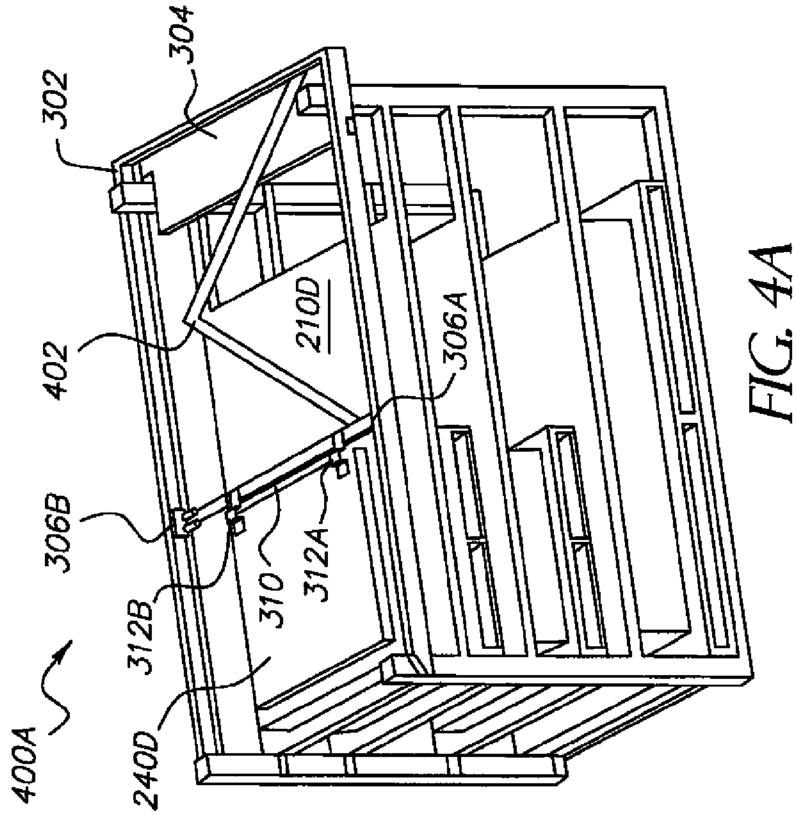

FIGS. 4A-4E are perspective and side views illustrating plate picking according to one embodiment of the invention. FIG. 4A is a perspective view of PSU 112 during an exemplary plate picking operation of a plate from the top shelf. Picker elevator 302 ascended to enable access to plate stack 240D located on shelf 210D. Plate picker 310 moved to a first pick position (as shown) for plate stack 240D from its parked position on plate picker shelf 304. In the first pick position, plate picker 310 is ready to pick the top plate. In this example, plate stack 240D was loaded such that the plate stack is rotated with a small clockwise rotation relative to PSU 112. Plate picker 310 moved at high speed to an estimated plate stack position, based on information configured about the plate stack and information from the last pick from this stack. Plate picker 310 then moved at low speed until it was in a first pick position. Umbilical arm 402, or other flexible cabling mechanism, provides for compressed air, vacuum, electrical and other connections to couple plate picker 310 with fixed receptacles on plate picker shelf 304. Flexible cabling (not shown) from plate picker shelf 304 to fixed terminations in PSU 112 complete the connections.

Plate stack 240 rotational variations from an intended orientation of at least ten millimeters for picking edge (edge proximal to plate picker 310) corner positions is desirable to simplify loading. For example, one corner of the picking edge can have a position that is ten millimeters different in the plate path direction than the other picking corner. Positional variations of at least 10 millimeters, laterally, from an intended position the top plate can be desirable to simplify loading. Many references can be used for determining plate position. One exemplary reference is the center point of the picking edge. Practically, moving or loading a pallet of plates, without some holding mechanism may cause plates to shift so that their edges are not aligned. Thus, even accurate positioning of pallet 230 may cause at least some plates in plate stack 240 to rotate or shift position. In one embodiment, positional variations of up to 50 millimeters and rotational variations of up to 30 millimeters from an intended placement can be accommodated.

An intended placement can be determined by a number of methods. One exemplary method is for PHS 110 to specify the intended placement and for the user to attempt to load plate stack 240 close to the intended placement. Another exemplary method is for the user to load plate stack 240 with an arbitrary position and provide PHS 110 with information about the plate stack to enable PHS 110 to estimate plate stack 240 position. For example, the user could provide PHS 110 with an approximate measured position of plate stack 240, an approximate measured height of plate stack 240 or pallet 230, as well as dimensions for and a quantity of plates in plate stack 240. PHS 110 can then estimate plate stack 240 position and elevation and estimate how to position plate picker 310 on approach to the picking edge of the top plate.

As plate picker 310 approached plate stack 240D at low speed, horizontal and vertical sensors, mounted, for example, on each picker element 312, detected the top and proximal edges of plate stack 240D respectively. Picker elevator 302 moved to position both picker elements 312 at the top of plate stack 240D. Plate picker mounts 306 moved independently to position each picker element 312 at their initial proximal edge position. Then, each picker element 312 moved transversely to position themselves at their corresponding plate stack 240D corners. Plate picker mounts 306 moved independently to maintain picker elements 312 in position at the proximal edge while moving to the corners. In the resulting first pick position; plate picker 310 longitudinal axis is approximately parallel to the proximal edge of plate stack 240. During subsequent plate picking movements, this alignment is preserved.

Figure 4C:
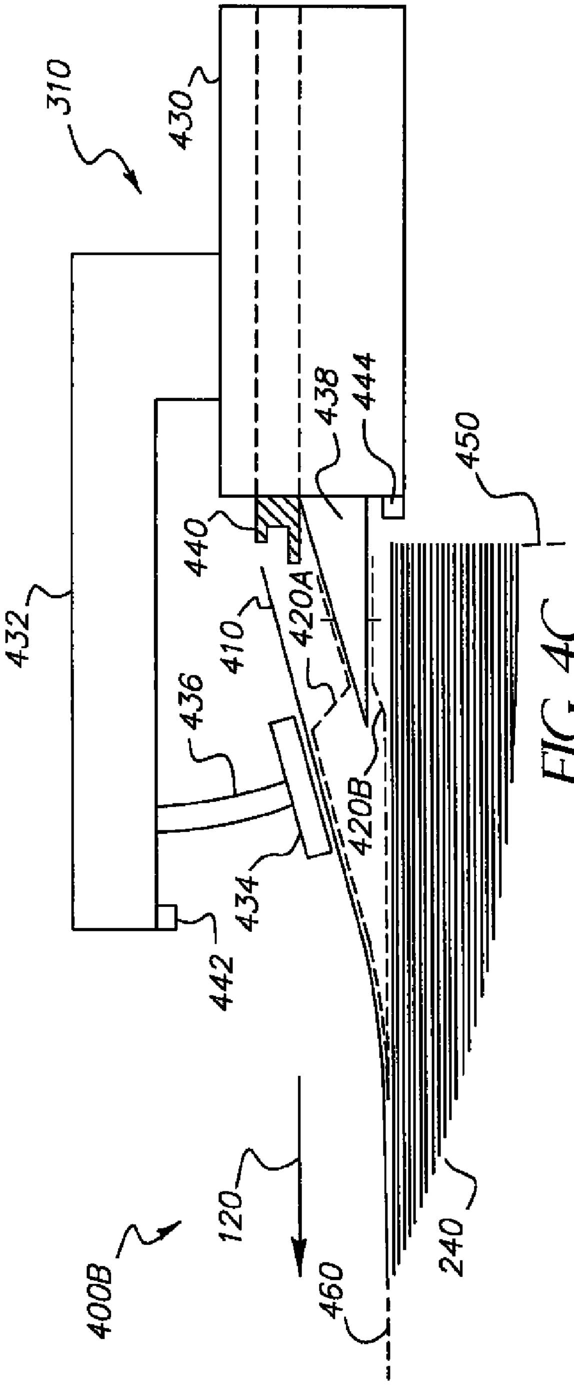
Figure 4D:
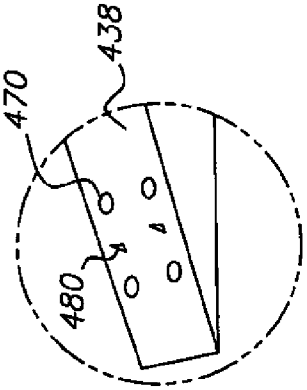
Figure 4E:
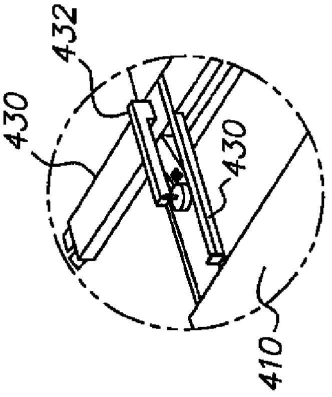

FIG. 4B is a side view of plate picker 310 in a second pick position corresponding to two top plate corners lifted and the interleaf slipsheet held. FIG. 4C is an expanded side view of plate picker 310 in a second pick position. Plate picker 310 comprises a plate picker bar 430 that extends between plate picker mounts 306 (not shown). One picker element 312 is depicted, which comprises, according to a preferred embodiment:

- a picker arm 432, mounted to plate picker bar 430;
- a horizontal sensor 444, such as an electro-optic sensor, mounted near the bottom of plate picker bar 430 and aligned with the longitudinal axis of picker arm 432;
- a slipsheet shoe 438 mounted above horizontal sensor 444 and aligned with the longitudinal axis of picker arm 432; and
- an extendable plate pusher 440.

Picker arm 432 includes a vertical sensor 442, such as an electro-optic sensor, mounted at the leading edge the arm. It also includes a plate lifter 434, which is attached to picker arm 432 by coupling 436. In one embodiment, plate lifter 434 is a plate cup, which blows air onto the top surface of a plate to lift the plate, without making contact, according to the Bernoulli principle. Different plate lifting mechanisms can be substituted in other embodiments of the invention. For example, a suction cup can be used to lift the plate.

When picker element 312 was in a first pick position vertical sensor 442 was approximately aligned with proximal edge 450 and horizontal sensor 444 was approximately aligned with top edge 460 of plate stack 240. Plate picker 310 moved in the direction of plate path 120 while picker element 312 simultaneously activated plate lifter 434. As each picker element 312 advanced, picked plate 410 was lifted creating a gap between plate 410 and plate stack 240 of sufficient height to allow slipsheet shoe 438 to extend into the gap a predetermined distance. This new picker element 312 position (as shown) corresponds to a second pick position.

Slipsheet 420A and 420B correspond to one slipsheet 420, located directly below picked plate 410, in one of two exemplary positions. Slipsheet 420A corresponds to slipsheet 420 being attracted, by static or other weak forces, to picked plate 410. Slipsheet 420B corresponds to slipsheet 420 being attracted, by static or other weak forces, to plate stack 240. In either case, slipsheet shoe 438 (shown in a perspective view in FIG. 4D) attracts and holds slipsheet 420. In a preferred embodiment, holes 470, located on both top and bottom surfaces of slipsheet shoe 438, attract slipsheet 420 using a vacuum. Once attracted, slipsheet 420 is pierced by pins 480, located on both top and bottom surfaces of slipsheet shoe 438, which limit lateral slipsheet movement. Different mechanisms for attracting and holding a slipsheet can be substituted in other embodiments of the invention. For example, once attracted a mechanical clamp or high friction shoe surface can aid in holding slipsheet 420.

Once both picker elements 312 are in the second pick position, they are actuated to achieve a third pick position.

The third pick position (depicted in FIG. 4E) corresponds to picked plate 410 moved in the plate path 120 direction while slipsheet 420 is held fast. This is accomplished by first extending plate pusher 440, using a linear motion system, with limited force until the proximal edge 450 of picked plate 410 is contacted. The axis of plate pusher 440 is preferably offset towards the center of picked plate 410 and parallel with the longitudinal axis of picker arm 432. When each plate pusher 440 has made contact, plate lifters 434 release picked plate while plate pushers 440 move in a coordinated fashion to a fully extended position using higher force so that the distal end of picked plate 410 extends into PTU 114. Different mechanisms for moving picked plate into PTU 114 can be substituted in other embodiments of the invention. For example, extendable arms that hook over the top of the lifted plate corners can pull picked plate.

Figure 5A:
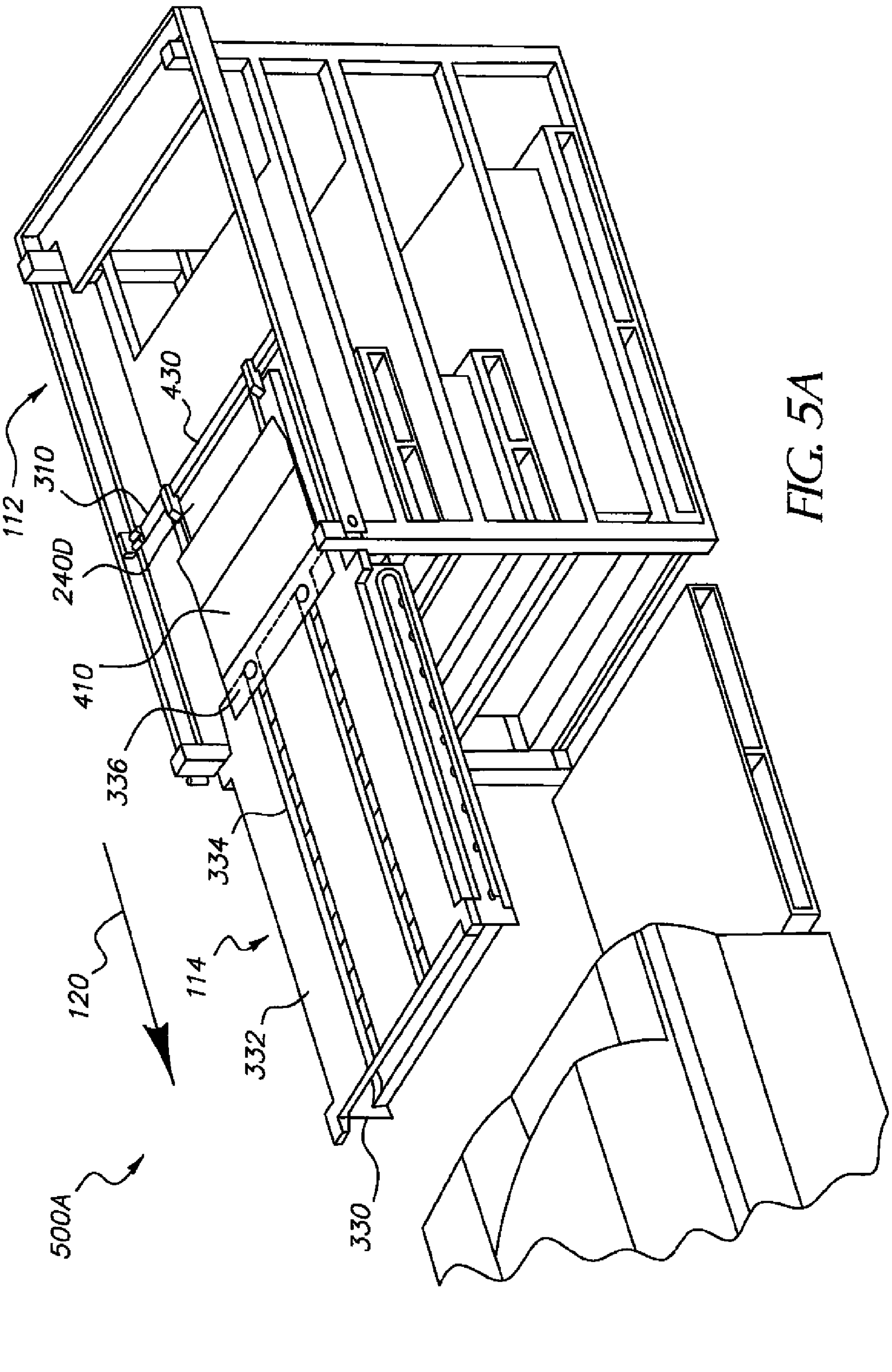
FIG. 5A is a perspective view of a plate picker transferring a picked plate to a plate transport unit according to one embodiment of the invention.

FIG. 5A is a perspective view of plate picker 310 transferring a picked plate (depicted with partial transparency for clarity) to transporter 330 according to one embodiment of the invention. For clarity, some aspects of PSU 112 and PTU 114 are not illustrated. The third pick position, described above, is depicted. Before progressing to the third pick position, transporter 330 must be moved into position to receive picked plate 410. First, transporter 330 ascended to a height where the top surface of support structure 332 is approximately aligned with the top surface of plate stack 240D. This positioning can be based on information used to position plate picker 310 or can be performed independently by information obtained from a plate sensor mounted on transporter 330.

Next, plate suction cups 336 moved to a pick up position located at the end, proximal to PSU 112, of slots 334. Picked plate 410, when moved into PTU 114 (as shown), is positioned directly above plate suction cups 336. Next, suction is applied so that picked plate 410 is firmly grasped on its bottom surface. Next, plate suction cups move in the direction of plate path 120, pulling picked plate 410 out of PSU 112 until it is completely supported by support structure 332. Different horizontal transporting mechanisms can be substituted in other embodiments of the invention. For example, a picked plate can be moved partway onto a conveyor belt support structure, which then pulls the picked plate into PTU 114.

Once picked plate 410 is completely supported by support structure 332, various optional mechanisms can be used to alter the positioning and path of the plate. For example, support structure 332 can be mounted on a turntable, which allows the plate path 120 to be altered, for example perpendicularly. This can facilitate an advantageous footprint for IS 102 and PHS 110. As another example, support structure 332 can include a turntable mounted in the top surface of the structure to allow picked plate 410 to be rotated by ninety degrees to facilitate a preferred load orientation in IS 102. As another example, support structure 332 can include a plate alignment mechanism to correct any small rotational misalignment caused by loading or picking plates.

Additionally, once picked plate 410 is completely supported, plate picker 310 can be retracted to either begin picking another plate from plate stack 240D or it can be parked on plate picker shelf 304 and elevated to the next plate stack 240. Before moving, however, slipsheet shoe 438 must release slipsheet 420. This can be accomplished, for example, by briefly changing airflow direction in holes 470 so that slipsheet 420 is blown off pins 480. Alternatively, pins 480 can be fastened to slipsheet shoe 438 by pivoting fasteners, which pivot on an axis that is horizontally transverse to plate path 120. Pivoting can be controlled by, for example, a solenoid. When slipsheet shoe 438 is retracted, pins 480 are pivoted in the direction of plate path 120 so that the slipsheet slides off the pins.

Figure 5B:
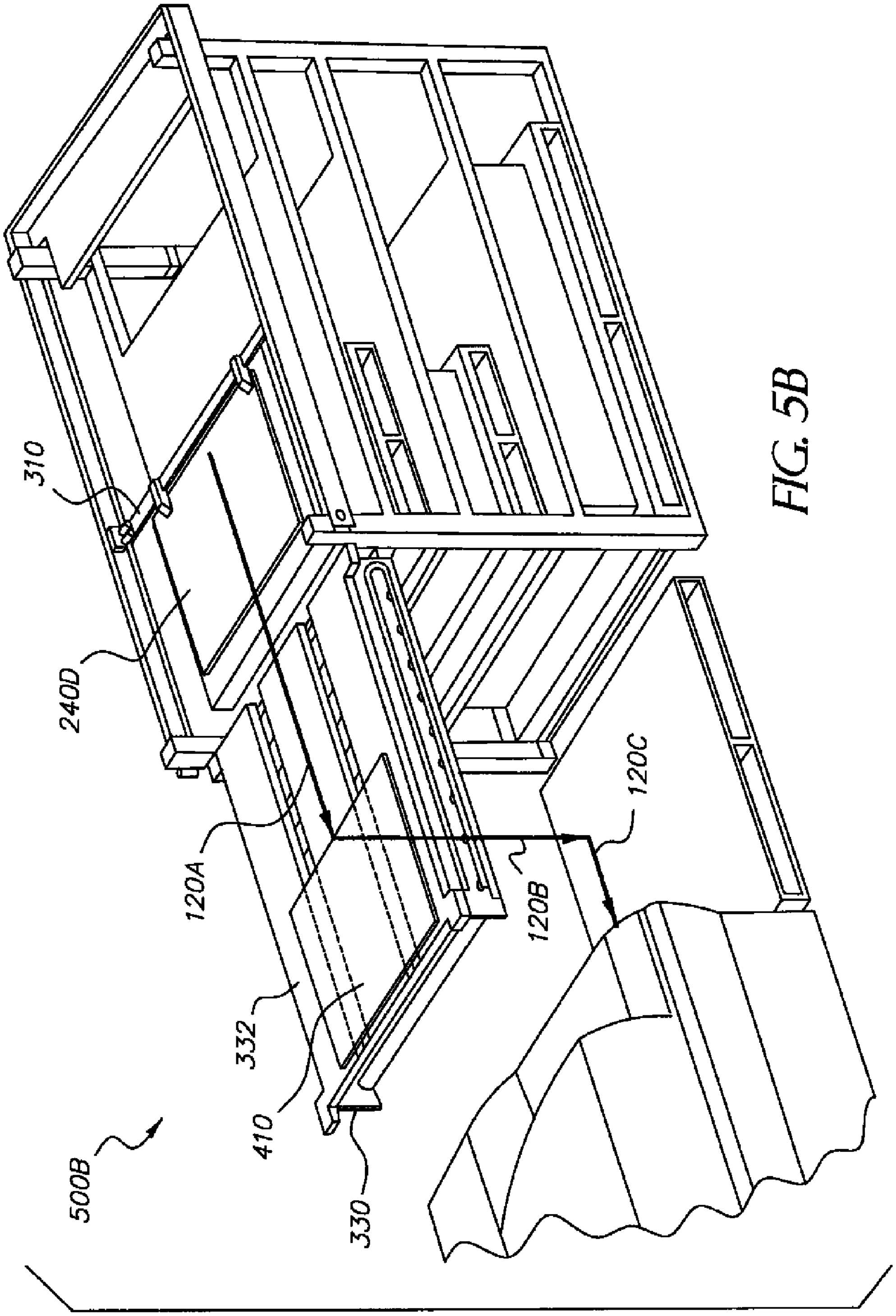
FIG. 5B is a perspective view of a plate transport unit transferring a picked plate to an imaging system according to one embodiment of the invention.

FIG. 5B is a perspective view of PTU 114 transferring a plate a picked plate to IS 102 according to one embodiment of the invention. The figure depicts transporter 330 at the plate pick up elevation with picked plate 410 in the completely supported position, having traversed plate path 120A. Next, transporter 330 moves picked plate 410 along plate path 120B to plate inlet 104 (not shown) height. Finally, picked plate is moved into plate inlet 102 where IS 104 pulls it along the remainder of plate path 120C. The initial movement along plate path 120C can be accomplished, for example, by turning off the vacuum on plate suction cups 336, moving them partway towards PSU 112, reapplying vacuum and moving plate suction cups 336 back towards IS 102. Different movement mechanisms can be substituted in other embodiments of the invention. The final movement along plate path 120C is accomplished by IS 102.

Figure 6:
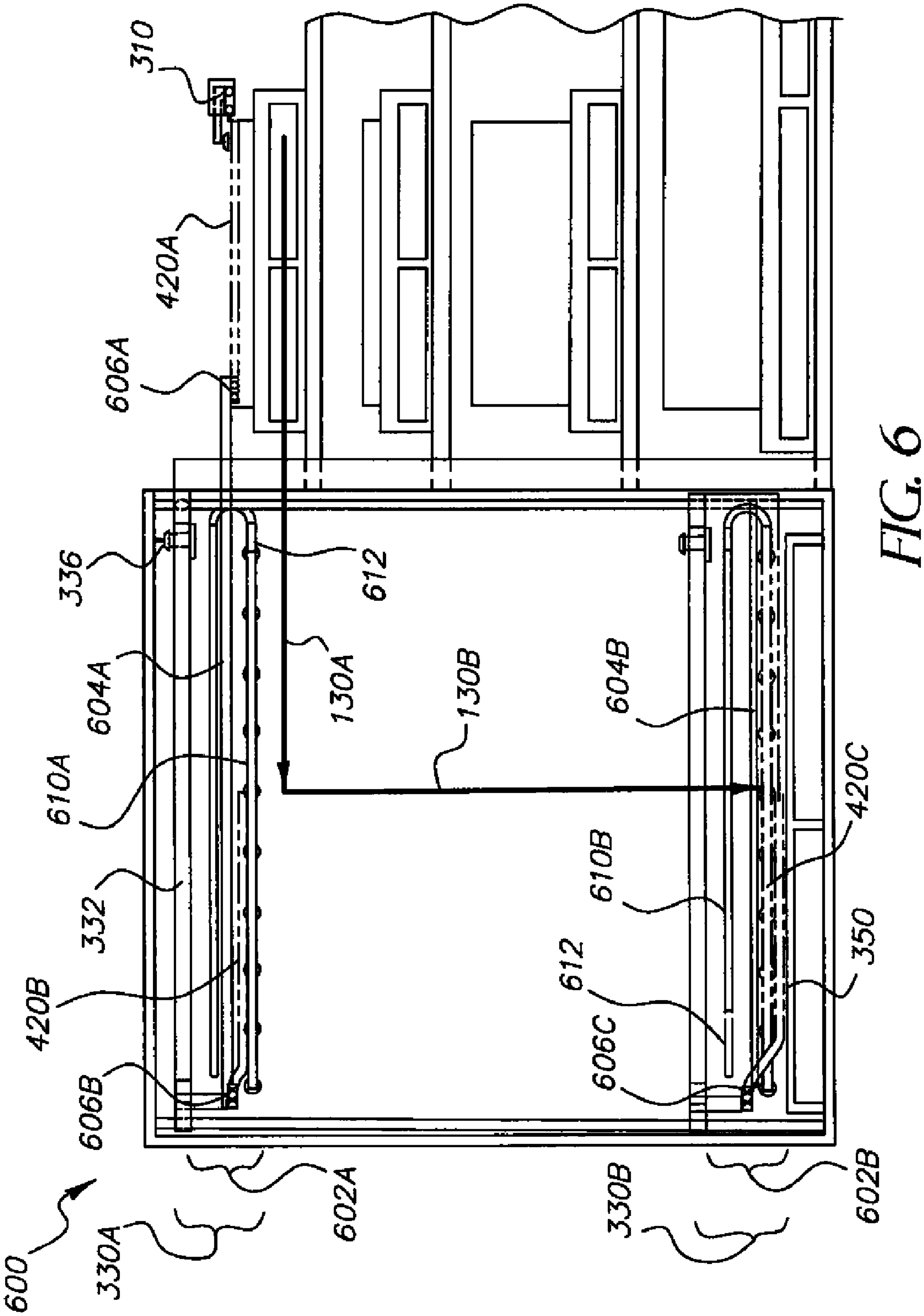
FIG. 6 is a side view of a plate handling system illustrating slipsheet disposal according to one embodiment of the invention.

FIG. 6 is a side view of PHS 110 illustrating slipsheet disposal according to one embodiment of the invention. Transporter 330 is depicted in two positions. In the first position, transporter 330A is ready to pick up slipsheet 420 from plate stack 240D. Transporter 330 includes a slipsheet transporter 602, which reaches into PSU 112 to obtain slipsheet 420 (depicted as 420A when positioned on the plate stack). In a preferred embodiment a vacuum bar accomplishes this. The vacuum bar 606 is located inside slipsheet transporter 602 and can move along a track 604 which is capable of extending partway into PSU 112. Vacuum is supplied to vacuum bar 606 by a hose in a flexible cable track or by other similar methods. Vacuum bar 606 has openings on its bottom surface that attract and hold slipsheet 420.

To obtain slipsheet 420A, vacuum bar 606 and track 604 is extended by a motorized leadscrew or other linear motion system for example, so that vacuum bar 606 is positioned (606A) directly above slipsheet 420A. An electro-optic sensor, for example, can be used to determine the correct position above slipsheet 420SA. In another embodiment, vacuum bar 606 can be coupled to the lower side of the plate vacuum bar system. In this case, transporter 330 may need to elevate to a new position to allow access to slipsheet 420A.

Next, vacuum is applied to attract slipsheet 420A. Then, vacuum bar 606 and track 604 is retracted and vacuum bar 606 is moved in the direction of slipsheet path 130A. At the end of the movement, vacuum bar 606 is positioned as shown (606B). Slipsheet 420 is positioned (420B) inside slipsheet transporter 602 and is partially supported by a sectional platform 610 positioned in a support position (610A). Sectional platform 610 can comprise a series of lightweight bars flexibly attached to each other at their extremities and supported by wheels or other low-friction supports that can travel along oval track 612. Vacuum bar 606B continues to hold slipsheet 420B in position.

Next, transporter 330 descends along slipsheet path 130B to a point just above slipsheet storage area 350. This position is depicted as transporter 330B. Next, platform 610 is moved, by a motorized pulley system for example, along oval track 612 to a release position (610B). As platform 610 moves and removes support, slipsheet 410 falls with an approximately flat profile on top of previously deposited slipsheets in slipsheet storage area 350. Finally, vacuum is removed and vacuum bar 606 releases the edge of slipsheet 410, allowing it to fall and lie flat on top of the slipsheet stack. Deposited slipsheets can be subsequently removed from slipsheet storage area 350.

Figure 7:
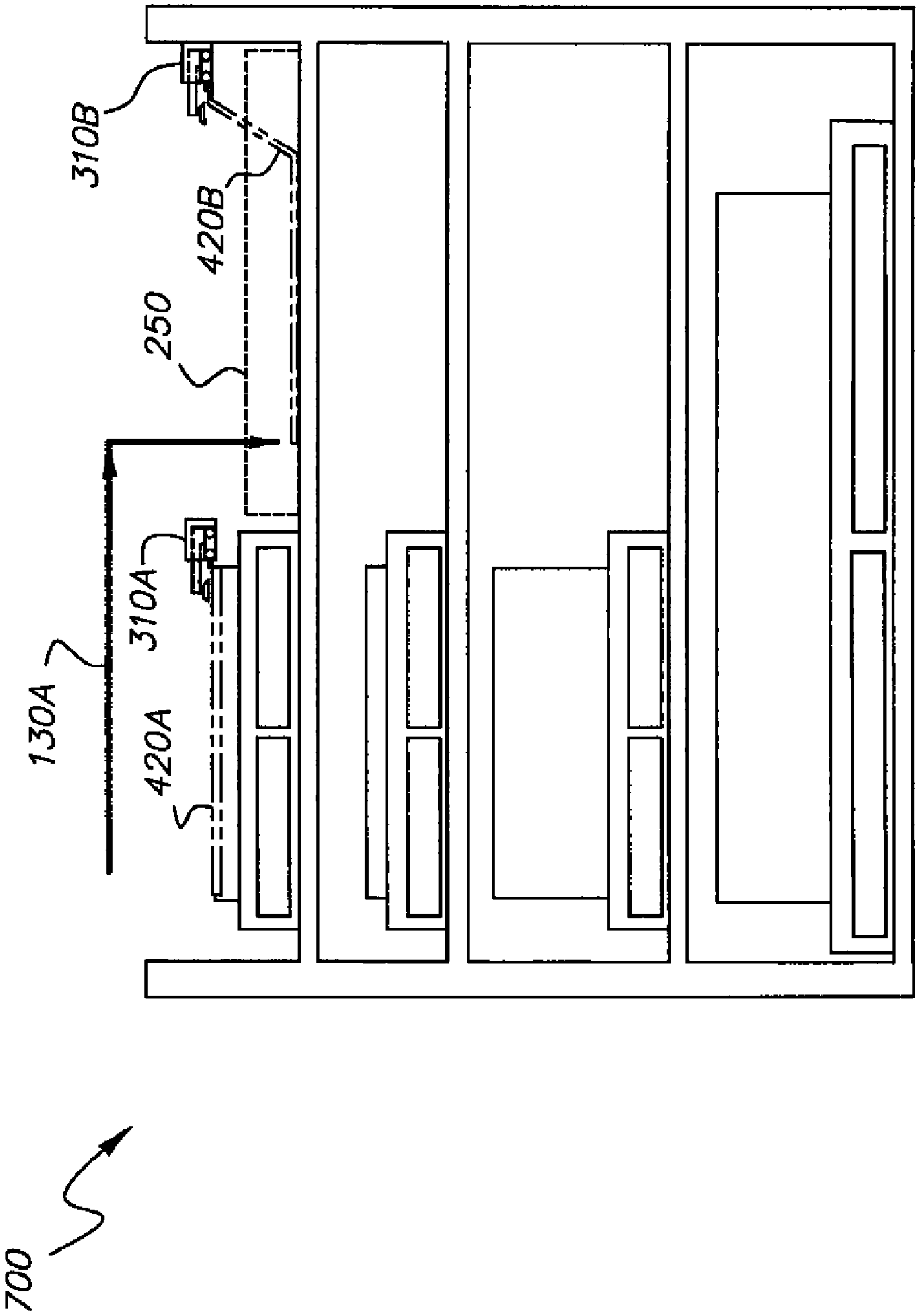
FIG. 7 is a side view of a plate handling system illustrating slipsheet disposal according to another embodiment of the invention.

FIG. 7 is a side view of a PHS 110 illustrating slipsheet disposal according to another embodiment of the invention. This embodiment is possible when alternative slipsheet storage area 250 occupies at least half the corresponding plate storage area 220. Plate picker 310 and slipsheet 420 are illustrated in two positions. In the first position, plate picker 310A is holding slipsheet 420A, with a picked plate having just transferred to PTU 114. Plate picker 310 then moves towards its parked position, pulling slipsheet 420 with it. When plate picker 310 reaches a position (310B), near its parked position, it releases slipsheet 420B. The edge of slipsheet 420B falls to storage shelf 210, coming to rest with an approximately flat profile.

The invention claimed is:

1. A method for handling printing plates prior to exposure by an imaging system, the method comprising:

adjusting a plate picker of a plate handling system to align with a plate in a storage area, the plate being positioned with an actual orientation in the storage area that is different from an intended orientation of the printing plate in the storage area;

operating the adjusted plate picker to pick the plate positioned with the actual orientation in the storage area;

moving the picked plate in a plate path direction to a transport position; and transporting the picked plate from the transport position to the imaging system for exposure.

2. A method according to claim 1 wherein adjusting the plate picker to align with the plate in the storage area comprises:

adjusting the plate picker with an actual orientation of a picking edge of a top plate of a plate stack located in the storage area, wherein the top plate has a picking edge having two corners and wherein the actual orientation of the picking edge differs from an intended orientation of the picking edge the method further comprising:

picking the top plate from the plate stack;

moving the picked top plate in a plate path direction to the transport position; and transporting the picked top plate from the transport position to the imaging system for exposure.

3. A method according to claim 2 wherein the actual orientation of the picking edge differs from the intended orientation of the picking edge by at least 10 millimeters measured as a difference between picking edge corner positions in the plate path direction.

4. A method according to claim 2 wherein the plate stack comprises a plurality of plates stacked vertically with a slipsheet disposed between adjacent plates.

5. A method according to claim 4 wherein the plate stack comprises a weight wherein the weight is at least 50 kilograms.

6. A method according to claim 4 wherein the top plate comprises an aluminum substrate and the top plate is of a size larger than 81 centimeters along a smaller edge and larger than 111 centimeters along a larger edge.

7. A method according to claim 6 wherein the plate stack comprises a quantity of plates and wherein the quantity is at least 50 plates.

8. A method according to claim 2 wherein an actual orientation of a picking edge of a first plate in the plate stack is different than an actual orientation of a picking edge a second plate in the plate stack.

9. A method according to claim 2 wherein the plate stack includes a conveyance device to support the plates in the plate stack and the method comprises placing the conveyance device on a support surface of the storage area.

10. A method according to claim 9 wherein the conveyance device comprises a pallet.

11. A method according claim 1 wherein a size of the storage area is sufficient to load a plurality of plate stacks in an arrangement and the method comprises loading a plate stack of the plurality of plate stacks in in an available space of the storage area.

12. A method according to claim 1 wherein adjusting the plate picker to align with the plate in the storage area comprises adjusting the plate picker with an actual orientation of a picking edge of a top plate in a plate stack located in the storage area, and the method further comprises:

obtaining information about the plate stack;

aligning the plate picker vertically with the top plate in the plate stack based on the information about the plate stack;

moving the plate picker toward the picking edge of the top plate based on the information about the plate stack;

detecting the actual orientation of the picking edge of the top plate; and moving the plate picker into a picking orientation that aligns with the detected actual orientation of the picking edge of the top plate.

13. A method according to claim 12 wherein the information about the plate stack includes an estimated picking edge position of the top plate in the plate stack.

14. A method according to claim 13 wherein the information about the plate stack includes:

plate stack dimensions, a quantity of plates in the plate stack, and plate dimensions.

15. A method according to claim 14 wherein the plate picker comprises:

a picker bar nominally disposed perpendicular to the plate path direction and operative to move along the plate path direction;

a plurality of picker elements mounted on the picker bar, each picker element being operative to independently move along the picker bar; and a plate detector coupled with each picker element for detecting a plate in the plate stack.

16. A method according to claim 15 wherein moving the plate picker toward the picking edge of the top plate based on the information about the plate stack comprises:

moving the plate picker bar along the plate path direction to the estimated picking edge position of the top plate; and moving the picker elements along the picker bar to estimated positions for one or more corners of the picking edge based on the estimated picking edge position and the plate dimensions.

17. A method according to claim 15 wherein detecting the actual orientation of the picking edge of the top plate comprises moving the picker bar and picker elements to position the plate detectors to detect the positions of one or more corners located on the picking edge of the top plate.

18. A method according to claim 15 wherein moving the plate picker into the picking orientation that aligns with the detected actual orientation of the picking edge of the top plate comprises moving the picker bar and picking elements to position the picking elements in alignment with the detected positions of one or more corners located on the picking edge of the top plate.

19. A method according to claim 18 wherein the plate picker comprises independent systems for moving each end of the picker bar along the plate path direction and wherein each system is flexibly coupled to an end of the picker bar to enable the picker bar to rotate relative to the plate path direction so that the picking elements can be positioned in alignment with the detected positions of the one or more corners of the picking edge of the top plate.

20. A method according to claim 18 wherein each picker element is operative to move independently along the plate path direction to allow picking elements to position in alignment with the detected position of respective corners of the picking edge of the top plate.

21. A method according to claim 15 wherein moving the picked plate in the plate path direction to the transport position comprises moving the picker elements along the plate path direction to move the top plate to the plate transport position.

22. A method according to claim 12 wherein the information about the plate stack includes information determined during a previous plate picking operation.

23. A method according to claim 12 wherein aligning the plate picker vertically with the top plate in the plate stack based on the information about the plate stack comprises moving the plate picker vertically to an estimated vertical height of the top plate.

24. A method according to claim 2 wherein picking the top plate from the plate stack comprises:

lifting each corner of the picking edge of the top plate;

attracting a slipsheet from a space below each lifted corner wherein the slipsheet is adhering to either the bottom surface of the top plate or the top surface of an underlying plate; and holding the attracted slipsheet.

25. A method according to claim 24 wherein each picker element comprises:

a plate cup suspended from a picker arm for lifting the corner of the top plate without contacting the plate;

a slipsheet shoe comprising vacuum holes on both the upper and lower surfaces for attracting the slipsheet; and a plate pusher operative to engage a lifted portion of the picking edge of the top plate.

26. A method according to claim 25 wherein lifting the corner of the picking edge of the top plate comprises blowing air through the plate cup to create a low pressure area to lift the plate corner.

27. A method according to claim 25 wherein attracting the slipsheet from the space below each lifted corner comprises:

moving the slipsheet shoe into the space below the lifted corner; and applying a vacuum to the slipsheet shoe to attract the slipsheet to a vacuum hole.

28. A method according to claim 27 wherein holding the attracted slipsheet comprises maintaining the vacuum to the slipsheet shoe.

29. A method according to claim 27 wherein the slipsheet shoe includes a separate holding device and wherein holding the attracted slipsheet comprises using the holding device to hold the slipsheet once it has been attracted.

30. A method according to claim 29 wherein the holding device comprises a pin for piercing the slipsheet upon it be attracted.

31. A method according to claim 25 wherein moving the picked plate in the plate path direction to the transport position comprises moving the plate pusher to move the top plate, along the plate path position to the plate transport position.

32. A plate handling system for supplying plates to an imaging system, the plate handling system comprising:

a plate storage facility comprising at least one storage area having a plate with an actual storage placement comprising an actual position and actual rotation, wherein the actual storage placement may differ from an intended placement of the plate;

a controller for controlling a plate handling operation;

a plate picker for picking the plate wherein the controller is operative to automatically determine the actual position and actual rotation of the plate and align the plate picker with the actual position and actual rotation of the plate prior to picking; and a plate transporter for transporting the picked plate to the imaging system for exposure.

33. A plate handling system according to claim 32, wherein:

the plate storage facility has a plate stack, and wherein the plate is part of the plate stack and comprises a picking edge having two corners and an actual position and an actual rotation, wherein the actual position and actual rotation of the picking edge differs from an intended position and an intended rotation of the picking edge; and the controller is operative to automatically determine the actual position and actual rotation of the picking edge and align the plate picker with the actual position and actual rotation of the prior to picking.

34. A plate handling system according to claim 33 wherein the determined actual position of the printing edge comprises a position of the center of the picking edge.

35. A plate handling system according to claim 33 wherein the determined actual position of the printing edge differs from the intended position of the picking edge by at least 10 millimeters laterally.

36. A plate handling system according to claim 33 wherein the determined actual rotation of the printing edge differs from the intended rotation of the printing edge by at least 10 millimeters measured as a difference between picking edge corner positions.

37. A plate handling system according to claim 33 wherein the plate stack comprises a plurality of plates stacked vertically with a slipsheet disposed between adjacent plates.

38. A plate handling system according to claim 37 wherein the plate stack is loaded in a single operation and wherein the plate stack comprises a weight of at least 50 kilograms.

39. A plate handling system according to claim 37 wherein the plate comprises an aluminum substrate and the plate is of a size larger than 81 centimeters along a smaller edge and larger than 111 centimeters along a larger edge.

40. A method according to claim 39 wherein the plate stack comprises a quantity of plates and wherein the quantity is at least 50 plates.

41. A plate handling system according to claim 32 wherein the plate picker comprises:

a picker bar operative to move along a plate path direction, the picker bar being nominally disposed perpendicular to the plate path direction;

a plurality of picker elements mounted on the picker bar, each picker element operative to independently move along the picker bar; and a plate detector coupled with each picker element for detecting the plate.

42. A plate handling system according to claim 41 wherein the plate is a top plate in a plate stack and the controller is operative to:

obtain information about the plate stack;

move the plate picker vertically to align with the top plate based on the information about the plate stack;

move the plate picker toward a picking edge of the top plate based on the information about the plate stack;

move the picker bar and picker elements to position the detectors to detect the positions of one or more corners of the picking edge of the top plate;

determine an actual position and an actual rotation of the picking edge from the detected positions the one or more corners of the picking edge of the top plate;

move the plate picker into a picking orientation that aligns with the determined actual position and actual rotation of the picking edge of the top plate;

operate the plate picker to pick the top plate from the plate stack; and operate the plate transporter to transport the picked plate to the imaging system.

43. A plate handling system according to claim 41 wherein the plate picker is also operative to move the picked plate in the plate path direction to a transport position and wherein the plate transporter is operative to transport the picked plate from the transport position to the imaging system.

44. A plate handling system according to claim 43 wherein the controller is also operative to operate the plate picker to move the picked plate in the plate path direction to the transport position.

* * * * *